(12) United States Patent
Yang et al.

(10) Patent No.: US 12,224,670 B2
(45) Date of Patent: Feb. 11, 2025

(54) FREQUENCY REGULATING CIRCUIT, FREQUENCY REGULATING METHOD AND SWITCHING CIRCUIT

(71) Applicant: Joulwatt Technology Co., Ltd., Hangzhou (CN)

(72) Inventors: Yang Yang, Hangzhou (CN); Mengyi Huang, Hangzhou (CN); Xiangyong Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 239 days.

(21) Appl. No.: 17/951,930

(22) Filed: Sep. 23, 2022

(65) Prior Publication Data

US 2023/0094128 A1    Mar. 30, 2023

(30) Foreign Application Priority Data

Sep. 23, 2021    (CN) .......................... 202111112680.2

(51) Int. Cl.
*H02M 3/335*    (2006.01)
*H02M 1/00*    (2006.01)

(52) U.S. Cl.
CPC ..... *H02M 3/33569* (2013.01); *H02M 1/0054* (2021.05)

(58) Field of Classification Search
CPC ............. H02M 1/0022; H02M 1/0054; H02M 3/33569
See application file for complete search history.

(56) References Cited

U.S. PATENT DOCUMENTS

2014/0218975 A1*  8/2014  Lin .......................... H03K 7/08
                                                            363/21.01

FOREIGN PATENT DOCUMENTS

DE          10040411 A1 *  3/2002  .......... H02M 1/4225

* cited by examiner

*Primary Examiner* — Harry R Behm
(74) *Attorney, Agent, or Firm* — Bayramoglu Law Offices LLC

(57) ABSTRACT

A frequency regulating circuit for a switching circuit, a frequency regulating method, and the switching circuit are provided. The frequency regulating circuit includes a charging current generating module configured to receive a first signal characterizing an output power and a second signal characterizing an input voltage to generate a charging current and a signal generating module configured to output a third signal according to the charging current. The third signal is used to adjust the maximum operating frequency of the switching circuit so that the maximum operating frequency decreases with the increase of the input voltage. Therefore, the frequency regulating circuit increases the maximum operating frequency of the switching circuit under the condition of low voltage input, which decreases the maximum operating frequency of the switching circuit under the condition of high voltage input to reduce the switching loss of the switching circuit with wide input voltage and improve efficiency.

16 Claims, 7 Drawing Sheets

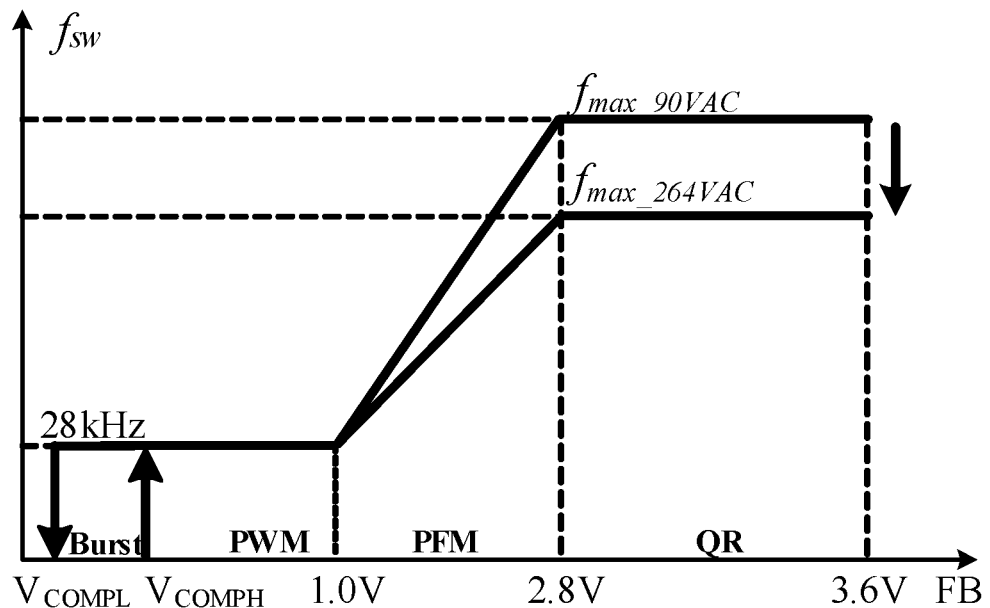

FIG. 8

S901: generating a charging current according to a first signal characterizing the output voltage and a second signal characterizing the input voltage

↓

S902: outputting a third signal according to the charging current. The third signal is used to adjust the maximum operating frequency of the switching circuit, so that the maximum operating frequency decreases with the increase of the input voltage

FIG. 9

FREQUENCY REGULATING CIRCUIT, FREQUENCY REGULATING METHOD AND SWITCHING CIRCUIT

CROSS REFERENCE TO THE RELATED APPLICATIONS

This application is based upon and claims priority to Chinese Patent Application No. 202111112680.2, filed on Sep. 23, 2021, the entire contents of which are incorporated herein by reference.

TECHNICAL FIELD

The present disclosure relates to the technical field of power electronics and more particularly to a frequency regulating circuit, a frequency regulating method, and a switching circuit.

BACKGROUND

With the rapid development of power electronic technology, switching converters are more widely used, and especially high requirements are put forth for switch converters to have high power density, high reliability, small volume, and wide input voltage. Flyback topology has the advantages of simple structure and low cost and has been widely used in charging power supply, railway power supply, communication power supply, photovoltaic power generation, and other fields. However, the common flyback topology has problems with taking into account the efficiency and temperature rise of high voltage and low voltage at the same time in the case of a wide input voltage range, so the volume, efficiency, and input voltage range of the common flyback converter are limited.

The Quasi-Resonant (QR) flyback converter can realize the trough conduction of the primary main power switching unit and reduce the switching loss. The low circuit cost and simple control method of the QR flyback converter make it a popular topology in low-power switched-mode power supply applications. In high-frequency applications, although the QR flyback converter can achieve trough conduction, in the case of wide input voltage, it is usually necessary to make a compromise on the design of the switching frequency to balance the efficiency and temperature rise of low voltage and high voltage. In this case, the low-voltage operating frequency is lower than its optimal operating frequency, thus resulting in low-voltage high peak current, magnetic flux density, and large conduction loss. The high-voltage operating frequency is higher than its optimal operating frequency, thus resulting in a large switching loss. In the prior art, the maximum operating frequency is fixed, which does not have the function of frequency compensation, and cannot take into account the efficiency of low voltage input and high voltage input. Therefore, it is necessary to design a frequency converter with a dynamic response, so that the maximum frequency of the frequency converter is increased under the condition of low voltage input, subjecting the switching circuit to work in the QR mode as long as possible, and the maximum frequency of the frequency converter is decreased under the condition of high voltage input to reduce the switching loss of the switching circuit and improve the efficiency.

Therefore, it is highly desirable to provide an improved frequency regulating circuit to effectively reduce circuit loss and balance temperature rise with efficiency.

SUMMARY

The content of the present disclosure is provided to introduce some of the concepts to be further described in the detailed description below in a simplified form. The content of the present disclosure is not intended to identify the key or necessary features of the subject matter to be protected nor is it intended to limit the scope of the subject matter to be protected.

An objective of the present disclosure is to provide an improved frequency regulating circuit to reduce circuit loss and improve efficiency. The aforementioned and other objectives are achieved by the features recited in the independent claims. Further forms of implementation are apparent from the dependent claims, specifications, and drawings.

According to the first aspect of the present disclosure, a frequency regulating circuit for a switching circuit is provided. The switching circuit is configured to receive an input voltage and generate an output voltage, and the frequency regulating circuit receives a first signal characterizing an output power and a second signal characterizing an input voltage to generate a third signal. The third signal is used to adjust the maximum operating frequency of the switching circuit so that the maximum operating frequency decreases with the increase of the input voltage.

Optionally, the frequency regulating circuit includes a charging current generating module configured to receive the first signal and the second signal to generate a charging current and a signal generating module configured to output the third signal according to the charging current.

Optionally, the charging current generating module adjusts the amount of the charging current according to the second signal characterizing the input voltage, and the charging current decreases with the increase of the input voltage.

Optionally, the charging current generating module further includes a bias current generating circuit configured to generate a bias current for limiting a minimum value of the charging current. The sum of the charging current and the bias current is used as a second charging current. The second charging current is used as an output signal of the charging current generating module.

Optionally, the charging current generating module includes: the first current configured to be controlled by the first signal, which is a feedback voltage, and the greater the feedback voltage, the greater the first current; the second current configured to be controlled by the second signal, and the larger the second signal, the greater the second current; the third current configured to be a difference between the first current and the second current; and the charging current is configured to be directly proportional to the third current.

Optionally, the charging current generating module includes a variable resistor, where a first terminal of the variable resistor receives a voltage, a resistance value of the variable resistor is inversely proportional to the first signal, and a current flowing through the variable resistor is the third current; a maximum frequency setting resistor, where a first terminal of the maximum frequency setting resistor is connected to the variable resistor, a second terminal of the maximum frequency setting resistor is connected to the reference ground, and a current flowing through the maximum frequency setting resistor is the first current; a second current generating module, where the second current generating module is configured to be controlled by the second signal to generate the second current increasing with the increase of the second signal; and a first current-controlled current source, where the first current-controlled current source is configured to be controlled by the third current flowing through the variable resistor to generate the charging current to be directly proportional to the third current.

Optionally, when the first signal is less than a first threshold, the resistance value of the variable resistor is infinite. When the first signal is greater than the first threshold and less than a second threshold, the resistance value of the variable resistor is inversely proportional to the first signal. When the first signal is greater than the second threshold, the resistance value of the variable resistor is zero.

Optionally, the second current generating module includes: a second current-controlled current source, where the second current-controlled current source is connected to both terminals of the variable resistor and is controlled by the second signal to generate the second current to be directly proportional to the second signal.

Optionally, the charging current generating module includes: a compensation resistor, where the compensation resistor receives the second signal and is connected between the maximum frequency setting resistor and the variable resistor, and a current flowing through the compensation resistor is the second current.

Optionally, the third signal is a monopulse signal, and the maximum operating frequency of the switching circuit is adjusted according to the frequency of the third signal.

Optionally, the signal generating module includes: a timing capacitor configured to receive the charging current to generate a capacitor voltage; a first switch transistor configured to reset the voltage of the timing capacitor; and a first comparator, where a first input terminal of the first comparator is connected to a first terminal of the timing capacitor, a second input terminal of the first comparator is connected to a reference voltage, an output terminal of the first comparator is connected to a control terminal of the first switch transistor, and the first comparator compares the capacitor voltage with a magnitude of the reference voltage to generate the third signal.

According to a second aspect of the present disclosure, a frequency regulating method is provided, including generating a charging current according to a first signal characterizing an output power and a second signal characterizing an input voltage and outputting a third signal according to the charging current. The third signal is used to adjust the maximum operating frequency of the switching circuit so that the maximum operating frequency decreases with the increase of the input voltage.

Optionally, the step of generating the charging current further includes generating a bias current for limiting a minimum value of the charging current. The sum of the charging current and the bias current is used as a second charging current. The second charging current is used as an output signal of the charging current generating module.

Optionally, the step of generating the charging current includes controlling by the first signal to generate a first current, where the first signal is a feedback voltage, and as the feedback voltage increases, the first current increases; controlling by the second signal to generate a second current, and as the second signal increases, the second current increases; and obtaining a third current by performing a difference operation between the first current and the second current, where the charging current is configured to be directly proportional to the third current.

Optionally, the third signal is a monopulse signal, and the maximum operating frequency of the switching circuit is adjusted according to the frequency of the third signal.

According to a third aspect of the present disclosure, a switching circuit includes a turn-on signal control circuit configured to output a first turn-on signal; a turn-off signal control circuit configured to output a switch transistor turn-off signal; a frequency regulating circuit configured to receive a first signal characterizing an output power and a second signal characterizing an input voltage to generate a third signal; a logic circuit that receives the first turn-on signal and the third signal, outputs the first turn-on signal when a frequency of the first turn-on signal is lower than a frequency of the third signal, and outputs the third signal when the frequency of the first turn-on signal is higher than the frequency of the third signal; and a trigger, where a set terminal of the trigger receives an output signal of the logic circuit, a reset terminal of the trigger receives the switch transistor turn-off signal, and the trigger outputs a switch transistor drive signal.

Optionally, the frequency regulating circuit further includes a charging current generating module configured to receive the first signal and the second signal to generate a charging current, and a signal generating module configured to output the third signal according to the charging current.

Optionally, the frequency regulating circuit further includes a bias current generating circuit configured to generate a bias current for limiting a minimum value of the charging current. The sum of the charging current and the bias current is used as a second charging current. The second charging current is used as an output signal of the charging current generating module.

Optionally, the frequency regulating circuit includes a first current configured to be controlled by the first signal, where the first signal is a feedback voltage, and as the feedback voltage increases, the first current increases; a second current configured to be controlled by the second signal, and as the second signal increases, the second current increases; and a third current configured to be the difference between the first current and the second current, where the charging current is configured to be directly proportional to the third current.

Optionally, the third signal is a monopulse signal, and the maximum operating frequency of the switching circuit is adjusted according to the frequency of the third signal.

In the frequency regulating circuit, the frequency regulating method, and the switching circuit of the present disclosure, the operating frequency of the switching circuit is adjusted by introducing input voltage information, so that the maximum operating frequency of the switching circuit is increased under the condition of low voltage input, thus subjecting the switching circuit to work in a quasi-resonant mode as much as possible, and the maximum operating frequency of the switching circuit is decreased under the condition of high voltage input to reduce the switching loss of the switching circuit with wide input voltage and improve efficiency.

BRIEF DESCRIPTION OF THE DRAWINGS

To more clearly illustrate the technical solution in the embodiment of the present disclosure or the prior art, the following will briefly introduce the drawings that need to be used to describe the embodiment or the prior art description. It will become apparent that the drawings described below are some embodiments of the present disclosure, and for those skilled in the art, other drawings can be obtained according to these drawings without creative effort.

FIG. 8 shows a waveform of an output frequency varying with a feedback voltage under different input voltages according to an embodiment of the present disclosure.

FIG. 9 shows a flow chart of the method in an embodiment of the present disclosure.

In the following, the same reference number represents the same feature or the feature with at least the same function.

DETAILED DESCRIPTION OF THE EMBODIMENTS

Figure 1:
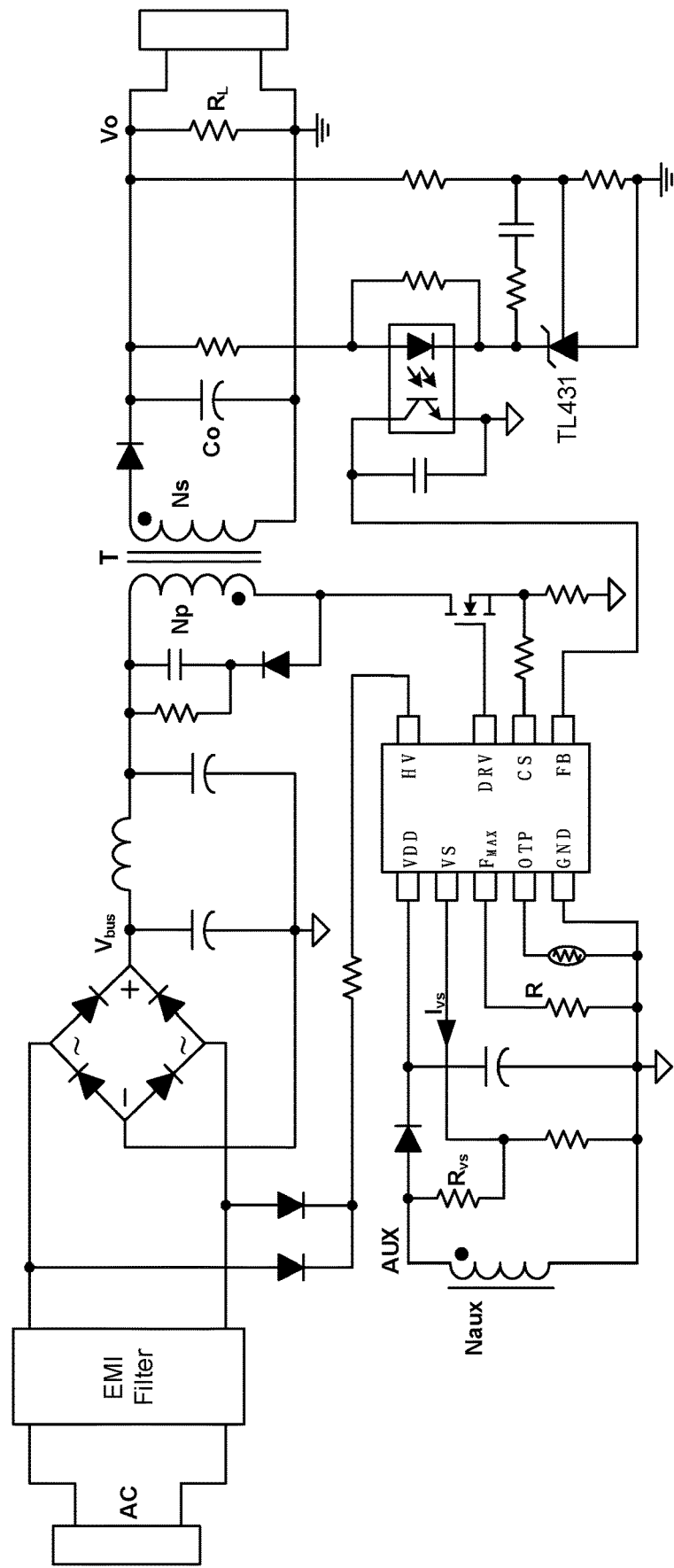
FIG. 1 shows a schematic diagram of a switching circuit in the prior art.

The technical solutions in the embodiments of the present disclosure will be described below in combination with the drawings in the embodiment of the present disclosure. It will become apparent that the embodiments described are some embodiments of the present disclosure, not all embodiments. Based on the embodiments in the present disclosure, all other embodiments obtained by those skilled in the art without creative work shall fall within the scope of protection of the present disclosure.

For example, it should be understood that the disclosure in conjunction with the described method also applies to the corresponding device or system used to perform the method and vice versa. For example, if a particular method step is described, the corresponding device may include a unit for performing the described method step, even if such a unit is not described or shown in detail in the drawings. On the other hand, for example, if a particular device is described based on a functional unit, the corresponding method may include a step of performing the described function, even if the step is not explicitly described or illustrated in the drawings. In addition, it should be understood that unless otherwise noted, the features of various embodiments described in the present disclosure can be combined.

It should be understood that the connection/coupling of A and B in the embodiments of the present disclosure means that A and B may be connected in series or parallel or A and B may be connected through other devices, which is not limited to the embodiments of the present disclosure.

FIG. 1 shows a schematic diagram of a traditional quasi-resonant (QR) flyback converter. As shown in FIG. 1, the flyback converter includes a primary rectifier circuit, a flyback switching transformer, an auxiliary winding circuit, a primary control circuit, and a secondary control circuit. Specifically, Vbus is a bus voltage obtained through rectification by the primary rectifier circuit, and Naux is an auxiliary winding. The primary control circuit includes a primary control chip. IVS is a value of an outflowing current from the VS pin when the Metal-Oxide-Semiconductor Field-Effect-Transistor (MOSFET) connected to the DRV pin is turned on, and IVS is configured to reflect the information of input voltage. An optical coupler in the secondary control circuit generates different feedback voltages according to the change of output power, and the feedback voltage is received by the FB pin of the primary control chip. A resistor R is a maximum frequency setting resistor connected to the primary control chip through the FMAX pin. After a frequency regulating circuit integrated into the primary control chip outputs the frequency to the next processing module, a switching frequency is outputted through the DRV pin. However, in the case of wide input operating voltage, the primary control chip does not have the function of frequency compensation and cannot take into account the efficiency of both low voltage and high voltage input at the same time, resulting in a significant loss of the circuit.

Figure 2A:
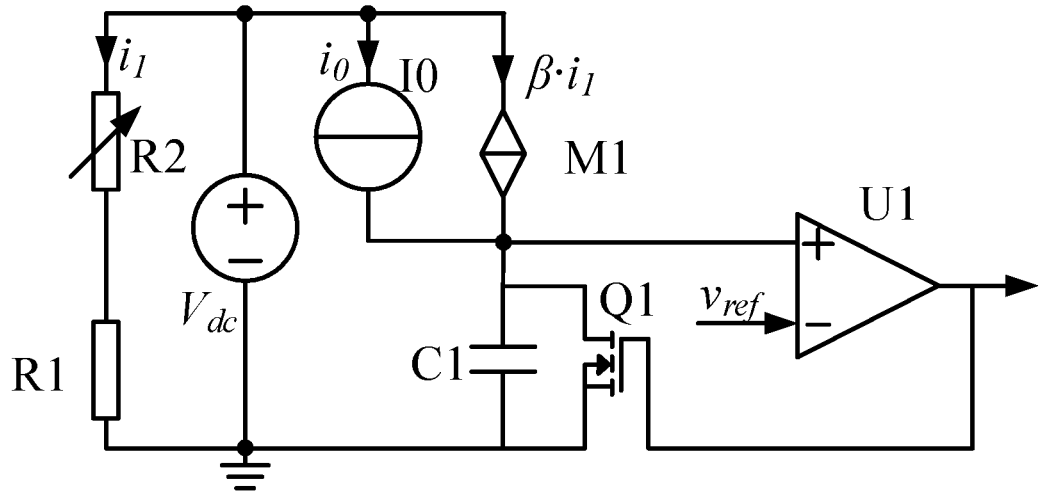
FIG. 2A shows a circuit structure diagram of a frequency regulating circuit in the prior art.
Figure 2B:
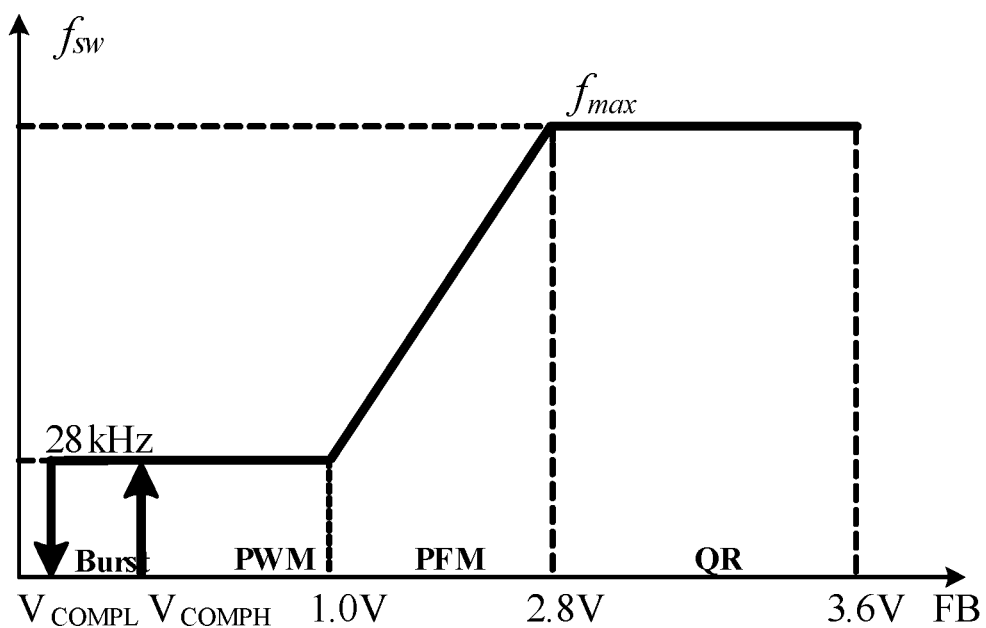
FIG. 2B shows a waveform diagram of an output frequency of the frequency regulating circuit in the prior art varying with a feedback voltage.

FIG. 2A shows a circuit structure diagram of a frequency regulating circuit in the prior art. FIG. 2B shows a waveform diagram of an output frequency of the frequency regulating circuit in the prior art with a varying feedback voltage.

As shown in FIG. 2A, the frequency regulating circuit includes a charging current generating module and a signal generating module. In the charging current generating module, the voltage Vdc is provided by a power supply circuit, and the charging current generating module includes the maximum frequency setting resistor R1, a variable resistor R2, a first current source I0, a first current-controlled current source M1, a first switch transistor Q1, a timing capacitor C1, and a voltage comparator U1. The relationship between a resistance value Rp of the variable resistor R2 and a feedback voltage FB is shown in FIG. 2B. When the feedback voltage FB is in the first interval, namely 0-1.0 V, as shown in FIG. 2B, the resistance value Rp of the variable resistor R2 is infinite. When the feedback voltage FB is in the second interval, namely 1.0 V-2.8 V, as shown in FIG. 2B, the resistance value Rp of the variable resistor R2 decreases linearly with the feedback voltage FB and finally decreases to 0Ω. When the feedback voltage FB is in the third interval, namely 2.8V-3.6V, as shown in FIG. 2B, the resistance value Rp of the variable resistor R2 is 0Ω. The maximum frequency setting resistor R1 is connected in series to the variable resistor R2, and the resistance value of the maximum frequency setting resistor R1 determines the maximum value of the output frequency of the frequency regulating circuit when the resistance value of R2 is 0Ω. The variable i1 is the current flowing through the variable resistor R2. The first current source I0 is configured to generate a constant bias current. The first current-controlled current source M1 is controlled by the current flowing through the variable resistor R2 to generate a current directly proportional to the variable resistor R2, and the proportional coefficient is β. The timing capacitor C1 receives the current generated by the first current-controlled current source M1 and the constant bias current to generate a capacitor voltage. The first switch transistor Q1 is configured to reset the voltage of the timing capacitor, and the control terminal of the first switch transistor Q1 is connected to an output terminal of the voltage comparator U1. A first input terminal of the voltage comparator U1 receives the capacitor voltage, and a second input terminal of the voltage comparator U1 receives a reference voltage. When the variable resistor R2 is infinite, the constant bias current provided by the first current source I0 is configured to limit the minimum value of the charging current, thereby limiting the minimum value of an output frequency waveform.

The charging current of the timing capacitor C1 is $i0+\beta \cdot i1$, where i0 is the current value of the constant bias current generated by the first current source I0, and $\beta \cdot i1$ is the current value of the current flowing through the first current-controlled current source M1. The current i1 flowing through the variable resistor R2 is Vdc/(Rfset+Rp), where Rfset is the resistance value of the maximum frequency setting resistor R1, and Vdc is the voltage value of the voltage provided by the power supply module. When the feedback voltage is less than 1.0 V, Rp=∞, and the current flowing through the variable resistor R2 is i1=0, so the charging current of the timing capacitor C1 has the minimum value of i0, and the output frequency is minimum. When the feedback voltage is between 1.0 V-2.8 V, the resistance value Rp of the variable resistor R2 decreases linearly with the feedback voltage FB, and the current i1 flowing through the variable resistor R2 increases linearly, so the generated frequency f is $(i0+\beta \cdot i1)/(Vref \cdot Cf)$. When the feedback voltage is greater than 2.8V, Rp=0, the timing capacitor C1 achieves the maximum charging current $i0+\beta \cdot (Vdc/Rfset)$ and the highest frequency fmax. The frequency generated by the frequency regulating circuit that varies with the feedback voltage is shown in FIG. 2B, and the highest frequency is a fixed value. The frequency regulating circuit does not have the function of frequency compensation and cannot take into account the efficiency of both low voltage and high voltage input at the same time, resulting in a significant loss of the circuit.

The present disclosure provides a frequency regulating circuit for a switching circuit. The switching circuit is configured to receive an input voltage and generate an output voltage. The frequency regulating circuit receives a first signal characterizing an output power and a second signal characterizing an input voltage to generate a third signal. The third signal is used to adjust the maximum operating frequency of the switching circuit so that the maximum operating frequency decreases with the increase of the input voltage.

Figure 3:
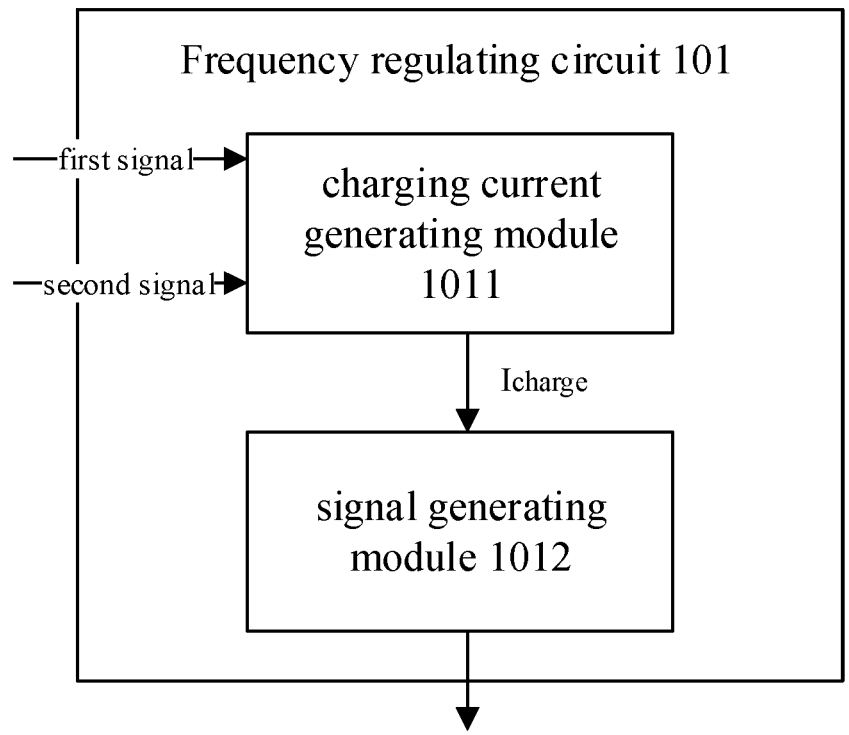
FIG. 3 shows a structural block diagram of an embodiment of the present disclosure.

FIG. 3 shows a structural block diagram of an embodiment of the present disclosure. As shown in FIG. 3, the frequency regulating circuit 101 includes the charging current generating module 1011 and the signal generating module 1012. The charging current generating module 1011 receives the first signal characterizing the output power and the second signal characterizing the input voltage to generate the charging current Icharge. The signal generating module 1012 receives the charging current Icharge to generate the third signal. The third signal is used to adjust the maximum operating frequency of the switching circuit so that the maximum operating frequency decreases with the increase of the input voltage. The frequency regulating circuit 101 may be fully or partially integrated inside or outside a primary control chip, which is not restricted herein.

Figure 4:
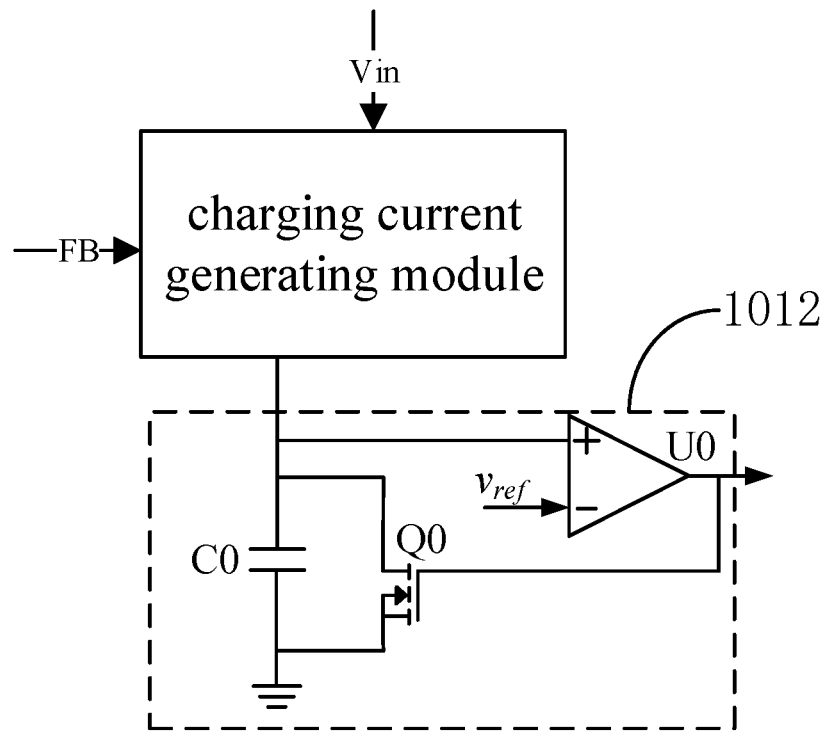
FIG. 4 shows a circuit structure diagram of a signal generating module of an embodiment of the present disclosure.
Figure 5:
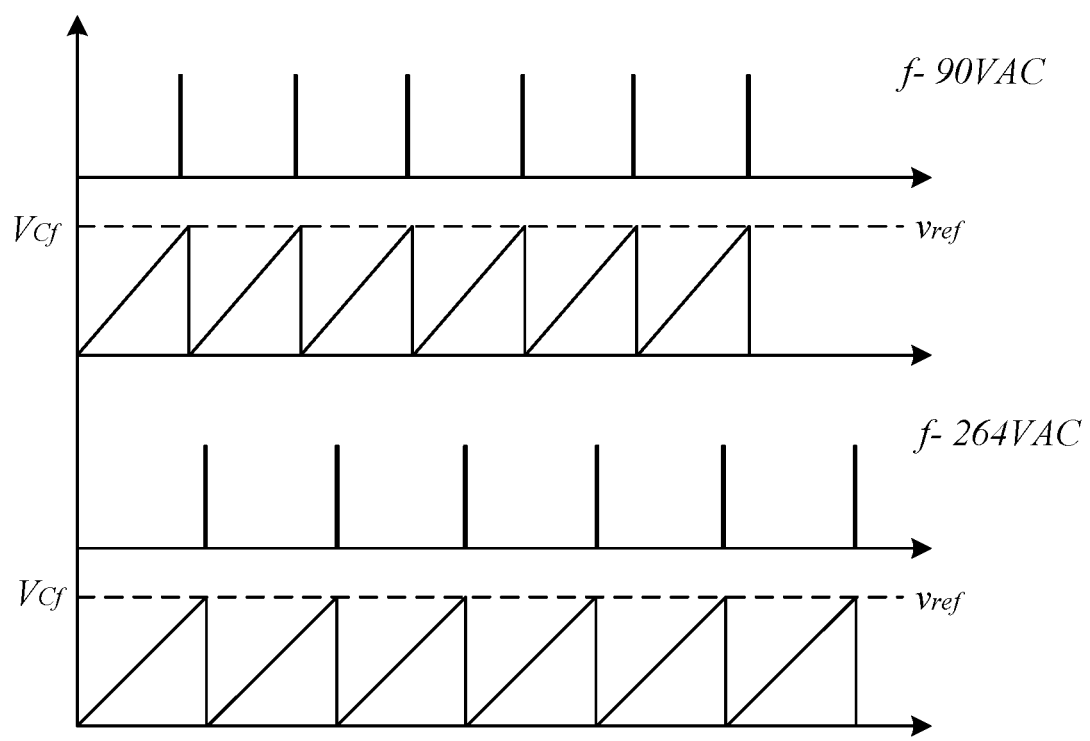
FIG. 5 shows an operating time sequence diagram under different input voltages according to an embodiment of the present disclosure.

FIG. 4 shows a circuit structure diagram of a signal generating module of an embodiment of the present disclosure. FIG. 5 shows an operating time sequence diagram of an embodiment of the present disclosure under different input voltages.

As shown in FIG. 4, the frequency regulating circuit includes a charging current generating module and the signal generating module 1012. Specifically, the signal generating module 1012 includes the voltage comparator U0, the first switch transistor Q0, and the timing capacitor C0. The timing capacitor C0 receives a charging current generated by the charging current generating module to generate a capacitor voltage, and the first switch transistor Q0 is connected at both terminals of the timing capacitor and configured to reset the voltage of the timing capacitor. A control terminal of the first switch transistor Q0 is connected to an output terminal of the voltage comparator U1. A first input terminal of the voltage comparator U0 receives the capacitor voltage, and a second input terminal of the voltage comparator U0 receives a reference voltage. The voltage of the timing capacitor is received by the voltage comparator U0 to be compared with the reference voltage. The timing capacitor C0 voltage reaches the reference voltage after being charged by the charging current for a period of time. The voltage comparator U0 outputs a signal to turn on the first switch transistor Q0 and releases the capacitor voltage of the timing capacitor. At the same time, the voltage comparator U0 outputs a pulse waveform. As shown in FIG. 5, when the input voltage is 90 VAC, the IVS is smaller, then the charging current is larger, the capacitor voltage rises faster, and the output frequency of the frequency control module is larger. When the input voltage is 264 VAC, the IVS is larger, the charging current is smaller, the capacitor voltage rises more slowly, and the output frequency of the frequency control module is smaller.

Some examples of the signal generating module of the embodiments of the present disclosure are described above. However, the embodiments of the present disclosure are not limited to those and may be extended and varied in other ways.

For example, it should be understood that the reference ground potential in the aforementioned embodiments may be replaced by other non-zero reference potentials (with positive or negative voltage amplitude values) or controlled variable reference signals in alternative embodiments.

For example, the resistors and capacitors provided by the embodiments of the present disclosure may be capacitive and resistive elements with lumped parameters or other equivalent elements with functions similar to the capacitor and resistor. The equivalent structures described here include, but are not limited to, the structures that provide inductive and/or capacitive impedance for microstrip lines, varactors, conductor structures with certain patterns, and the like.

Moreover, those skilled in the art may realize that, in combination with the structures and methods of the examples described in the embodiments disclosed herein, different configuration methods or adjustment methods can be used for each structure or reasonable variation of each structure can be used to achieve the described functions. However, such implementation shall not be considered to be beyond the scope of the present disclosure. In addition, it should be understood that the connection relationship between the various components of the amplifier in the aforementioned figures in the embodiments of the present disclosure is a schematic example and does not impose any restriction on the embodiments of the present disclosure.

Figure 6:
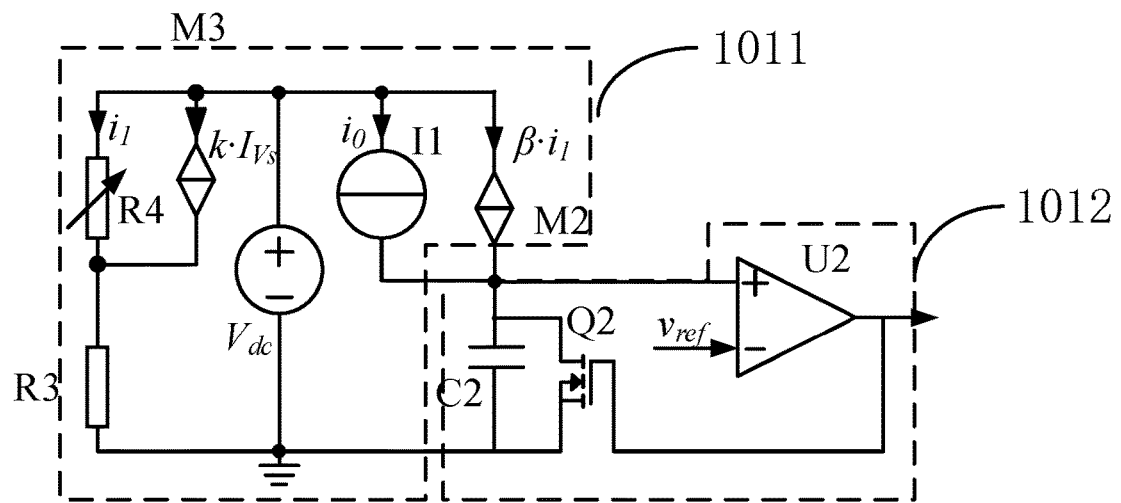
FIG. 6 shows a circuit structure diagram of another embodiment of the present disclosure.

FIG. 6 shows a circuit structure diagram of another embodiment of the present disclosure. As shown in FIG. 6, a frequency regulating circuit includes the charging current generating module 1011 and the signal generating module 1012. The frequency regulating circuit may be fully or partially integrated inside or outside a primary control chip, which is not limited herein. Specifically, the charging current generating module 1011 includes the maximum frequency setting resistor R3, the variable resistor R4, the first current source I1, the first current-controlled current source M2, and the second current-controlled current source M3. The signal generating module 1012 includes the first switch transistor Q2, the timing capacitor C2, and the voltage comparator U2. The maximum frequency setting resistor R3, the variable resistor R4, the first current source I1, the first current-controlled current source M2, the first switch transistor Q2, the timing capacitor C2, and the voltage comparator U2 provided in FIG. 6 are in one-to-one correspondence to the maximum frequency setting resistor R1, the variable resistor R2, the first current source 10, the first current-controlled current source M1, the first switch transistor Q1, and the timing capacitor C1 provided in FIG. 2A and have the same basic function, which will not be repeated here regarding the similarities.

As an example, two terminals of the second current-controlled current source M3 are connected to two terminals of the variable resistor R4, and the current generated by the second current-controlled current source M3 is directly proportional to the current flowing in through the VS pin, and the proportional coefficient is k. As the input voltage increases, the current value of the VS pin increases, and the current value of the second current-controlled current source M3 increases. Specifically, when the feedback voltage is less than 1.0 V, Rp=∞, although k·Ivs is not zero at the time, the current flowing through the variable resistor R2 is i1=0, so the charging current of the timing capacitor C1 has the minimum value of i0, and an output frequency achieves the minimum and is consistent with that the prior art in that the input voltage is not introduced. Therefore, the minimum frequency generated by the frequency regulating circuit does not change, which meets the frequency requirements of an operating mode of the switching circuit when the output power is not high. When the feedback voltage is greater than 1.0 V and less than 2.8 V, the current value in the maximum frequency setting resistor R3 is Vdc/(Rfset+Rp), the current i1 flowing through the variable resistor R4 is Vdc/(Rfset+Rp)−k·Ivs, and the charging current is i0+β·[Vdc/(Rfset+Rp)−k·Ivs]. The resistance value of the variable resistor R4 decreases with the increase of the feedback voltage FB. Therefore, the current i1 flowing through the variable resistor R4 begins to increase, and the output frequency increases with the increase of the feedback voltage FB. When the input voltage is different, IVS increases with the increase of the input voltage, and the slope of the output frequency decreases with the increase of IVS; that is, the slope of the output frequency decreases with the increase of the input voltage. When the feedback voltage is greater than 2.8 V, Rp=0, and the charging current of the timing capacitor C2 achieves the maximum value of i0+β·(Vdc/Rfset−k·Ivs). When the input voltage is different, the output frequency varies with the input voltage. As the input voltage increases, the maximum value of the output frequency decreases. As the input voltage decreases, the maximum value of the output frequency increases. The frequency regulating circuit increases the maximum operating frequency of the switching circuit under the condition of low voltage input, subjecting the switching circuit to work in a quasi-resonant mode as much as possible and decreasing the maximum operating frequency of the switching circuit under the condition of high voltage input to reduce the switching loss of the switching circuit with wide input voltage and improve efficiency.

Figure 7:
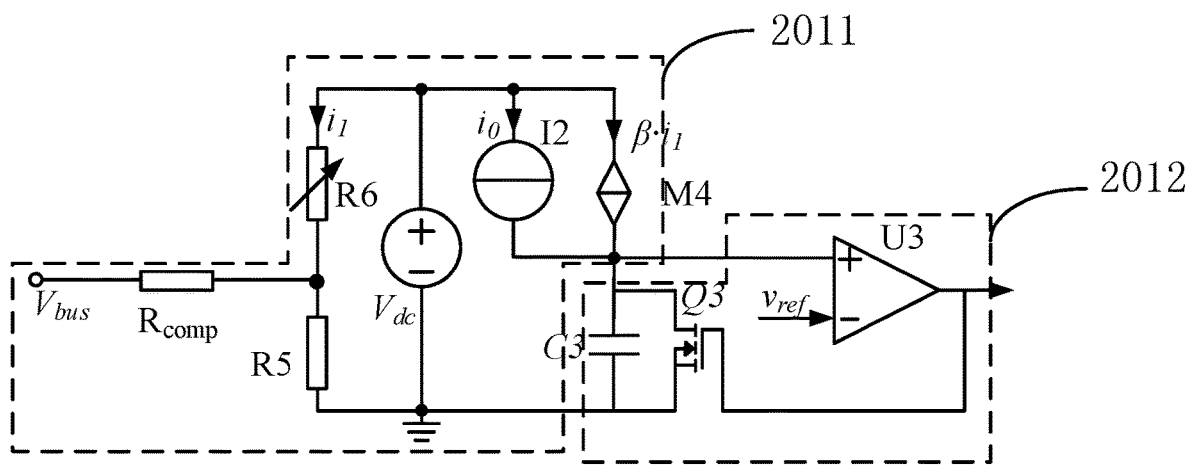
FIG. 7 shows a circuit structure diagram of yet another embodiment of the present disclosure.

FIG. 7 shows a structural block diagram of another embodiment of the present disclosure. As shown in FIG. 7, a frequency regulating circuit includes the charging current generating module 2011 and the signal generating module 2012. The frequency regulating circuit may be fully or partially integrated inside or outside a primary control chip, which is not limited herein. Specifically, the charging current generating module 2011 includes the maximum frequency setting resistor R5, the variable resistor R6, the first current source 12, the first current-controlled current source M3, and the compensation resistor R7. The signal generating module 2012 includes the first switch transistor Q3, the timing capacitor C3, and the voltage comparator U3. One terminal of the compensation resistor R7 is connected between the variable resistor R6 and the maximum frequency setting resistor R5, and a bus voltage is introduced at the other terminal of the compensation resistor R7. The maximum frequency setting resistor R5, the variable resistor R6, the first current source 12, the first current-controlled current source M3, the first switch transistor Q3, the timing capacitor C3, and the voltage comparator U3 provided in FIG. 7 are in one-to-one correspondence to the maximum frequency setting resistor R1, the variable resistor R2, the first current source 10, the first current-controlled current source M1, the first switch transistor Q1, and the timing capacitor C1 provided in FIG. 2A and have the same basic function, which will not be repeated here regarding the similarities.

As an example, a bus voltage is obtained by rectification of an input voltage. As the input voltage increases, the bus voltage increases. When a feedback voltage is less than 1.0 V, Rp=∞, and the current flowing through the variable resistor R6 is i1=0, so the charging current of the timing capacitor C1 has the minimum value of i0, and an output frequency achieves the minimum and is consistent with that in the prior art by not introducing the input voltage. Therefore, the minimum frequency generated by the frequency regulating circuit does not change, which meets the frequency requirements of an operating mode of the switching circuit when the output power is not high. When the feedback voltage is greater than 1.0 V and less than 2.8 V, the current i1 flowing through the variable resistor R6 is Vdc/(Rfset+Rp)−(Vbus−Vdc)/Rcomp, where Vbus is a voltage value of the bus voltage, Rcomp is a resistance value of the compensation resistor R7, and the charging current is i0+β[Vdc/(Rfset+Rp)−(Vbus−Vdc)/Rcomp]. The resistance value of the variable resistor R6 decreases with the increase of the feedback voltage FB. Therefore, the current i1 flowing through the variable resistor R6 begins to increase, and the output frequency increases with the increase of the feedback voltage FB. When the input voltage is different, Vbus increases with the increase of the input voltage, and the slope of the output frequency decreases with the increase of Vbus; that is, the slope of the output frequency decreases with the increase of the input voltage. When the feedback voltage is greater than 2.8 V, Rp=0, and the charging current of the timing capacitor C3 achieves the maximum value of i0+β·[Vdc/Rfset−(Vbus−Vdc)/Rcomp]. When the input voltage is different, the output frequency varies with the input voltage. As the input voltage increases, the maximum value of the output frequency decreases. As the input voltage decreases, the maximum value of the output frequency increases. The frequency regulating circuit increases the maximum operating frequency of the switching circuit under the condition of low voltage input, subjecting the switching circuit to work in a quasi-resonant mode as much as possible and decreasing the maximum operating frequency of the switching circuit under the condition of high voltage input to reduce the switching loss of the switching circuit with wide input voltage and improve efficiency.

Some examples of the frequency regulating circuit of the embodiments of the present disclosure are described above. However, the embodiments of the present disclosure are not limited to those and may be extended and varied in other ways.

FIG. 8 shows a waveform of an output frequency varying with a feedback voltage under different input voltages according to an embodiment of the present disclosure. As shown in FIG. 8, when the feedback voltage is less than 1.0V, the charging current is entirely provided by a constant bias current, so when the input voltage is at any value, the output frequency corresponds to the same value. When the feedback voltage is between 1.0 V-2.8 V, the output frequency increases linearly with the increase of the feedback voltage. When the input voltage is 90 VAC, the charging current increases, and the slope of the output frequency increases, while when the input voltage is 264 VAC, the charging current decreases, and the slope of the output frequency decreases. When the feedback voltage is greater than 2.8 V, and when the input voltage is 90 VAC, the charging current increases, and the maximum value of the output frequency increases. When the input voltage is 264 VAC, the charging current decreases, and the maximum value of the output frequency decreases.

FIG. 9 shows a flow chart of the method in an embodiment of the present disclosure. As shown in FIG. 9, a control method of a frequency regulating circuit includes steps S901 and S902. The control method of the frequency regulating circuit is used to adjust a frequency of a switching circuit, and the switching circuit is configured to receive an input voltage and generate an output voltage. For example, the frequency regulating method may be applied to any one of the frequency regulating circuits shown in FIG. 3, FIG. 4, FIG. 6, and FIG. 7.

In step S901, a charging current is generated according to a first signal characterizing an output power and a second signal characterizing the input voltage.

In step S902, a third signal is outputted according to the charging current. The third signal is used to adjust the maximum operating frequency of the switching circuit so that the maximum operating frequency decreases with the increase of the input voltage.

Optionally, the step of generating the charging current further includes generating a bias current for limiting a minimum value of the charging current. The sum of the charging current and the bias current is used as a second charging current. Specifically, the second charging current is used as an output signal of the charging current generating module.

Optionally, the step of generating the charging current includes controlling by the first signal to generate a first current, where the first signal is a feedback voltage, and as the feedback voltage increases, the first current increases; controlling by the second signal to generate a second current, and as the second signal increases, the second current increases; and obtaining a third current by performing a difference operation between the first current and the second current, where the charging current is configured to be directly proportional to the third current.

Optionally, the third signal is a monopulse signal, and the maximum operating frequency of the switching circuit is adjusted according to the frequency of the third signal.

Figure 10:
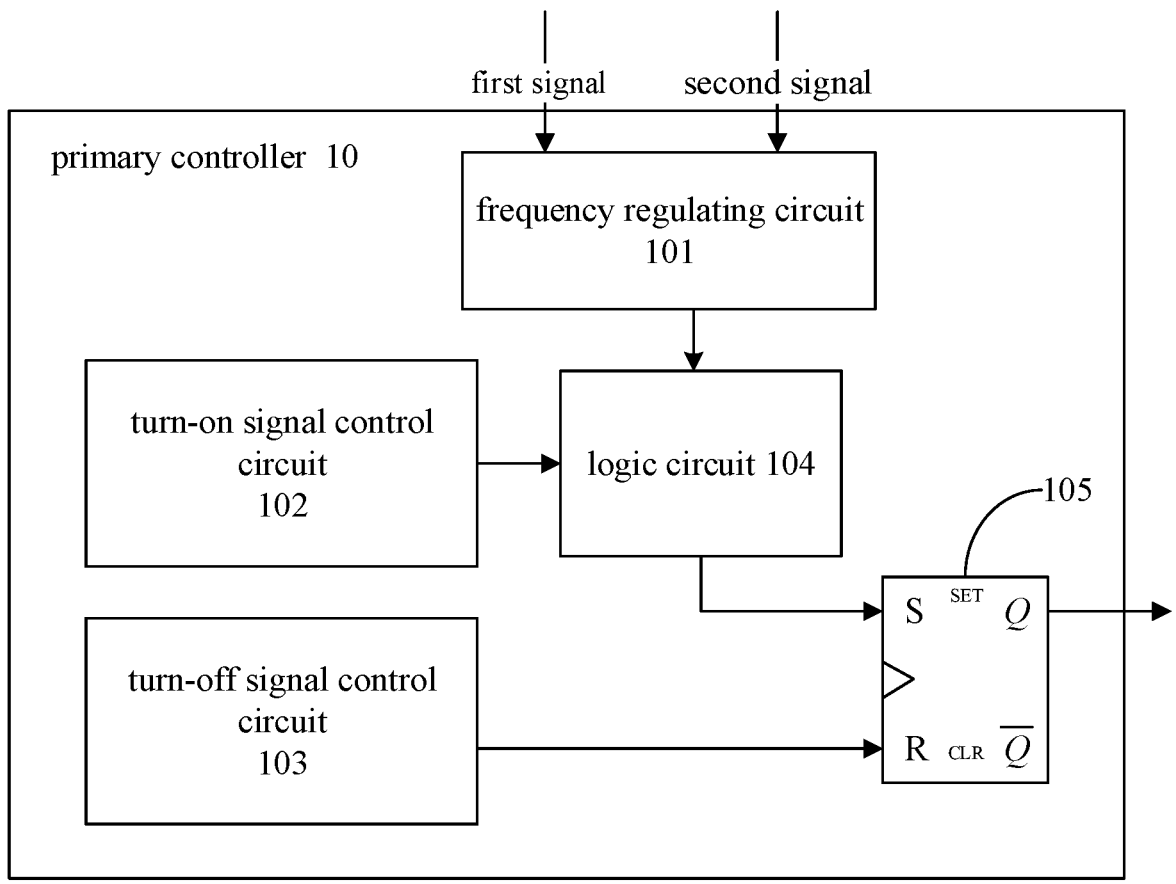
FIG. 10 shows a structural block diagram of an embodiment of a switching circuit of the present disclosure.

FIG. 10 shows a structural block diagram of an embodiment of a switching circuit of the present disclosure. As shown in FIG. 10, the switching circuit includes the primary controller 10. The primary controller 10 includes the frequency regulating circuit 101, the turn-on signal control circuit 102, the turn-off signal control circuit 103, the logic circuit 104, and the trigger 105. For example, the frequency regulating circuit may be any one of the frequency regulating circuits shown in FIG. 3, FIG. 4, FIG. 6, and FIG. 7.

As an example, the turn-on signal control circuit 102 is configured to output a first turn-on signal. The turn-off signal control circuit 103 is configured to output a switch transistor turn-off signal. The frequency regulating circuit 101 is configured to receive a first signal characterizing the output power and a second signal characterizing the input voltage to generate the third signal. The logic circuit 104 receives the first turn-on signal and the third signal, outputs the first turn-on signal when the frequency of the first turn-on signal is lower than the frequency of the third signal, and outputs the third signal when the frequency of the first turn-on signal is higher than the frequency of the third signal. A set terminal of the trigger 105 receives an output signal of the logic circuit, a reset terminal of the trigger 105 receives the switch transistor turn-off signal, and the trigger 105 outputs a switch transistor drive signal.

Optionally, the frequency regulating circuit further includes a charging current generating module configured to receive the first signal and the second signal to generate a charging current and a signal generating module configured to output the third signal according to the charging current.

Optionally, the frequency regulating circuit further includes a bias current generating circuit configured to generate a bias current for limiting a minimum value of the charging current. The sum of the charging current and the bias current is used as a second charging current. Specifically, the second charging current is used as an output signal of the charging current generating module.

Optionally, the frequency regulating circuit includes a first current configured to be controlled by the first signal, which is a feedback voltage, and as the feedback voltage increases, the first current increases; a second current configured to be controlled by the second signal, and as the second signal increases, the second current increases; and a third current configured to be the difference between the first current and the second current, where the charging current is configured to be directly proportional to the third current.

Optionally, the third signal is a monopulse signal, and the maximum operating frequency of the switching circuit is adjusted according to the frequency of the third signal.

Any range or device value given in the present disclosure can be extended or varied without losing the desired effect. In addition, any embodiment may be combined with another embodiment that is not explicitly prohibited.

Although the subject matter has been described in language specific to structural features and/or actions, it should be understood that the subject matter defined in the appended claims need not be limited to the specific features or actions described above. Rather, the specific features and actions described above are disclosed as examples of the implementation of claims, and other equivalent features and actions are intended to fall within the scope of claims.

It should be understood that the benefits and advantages mentioned above may involve one embodiment or may involve several embodiments. Embodiments are not limited to those that solve any or all of the aforementioned problems or have any or all of the aforementioned benefits and advantages. It should also be understood that a reference to "a" project can refer to one or more of those projects.

The steps of the method described here can be performed in any appropriate order or simultaneously in an appropriate situation. In addition, individual blocks can be removed from any method without departing from the spirit and scope of the subject matter described in the present disclosure. Aspects of any of the above embodiments may be combined with aspects of any other embodiments described to form further embodiments without loss of the desired effect.

The term "include/comprise," "contain," or any other variant thereof is intended to be non-exclusive, such that the process, method, item, or equipment including a series of elements not only includes those elements but can also include other elements that are not listed or also include inherent elements in the process, method, item, or equipment. In the absence of further restrictions, an element defined by the statement "includes a . . . " does not preclude the existence of additional identical elements in the process, method, item, or equipment including the element.

It should be understood that the above description is given as an example only and is subject to various modifications by those skilled in the art. The above instructions, examples, and data provide a complete description of the structure and use of exemplary embodiments. Although various embodiments with a degree of specificity have been described above regarding one or more individual embodiments, those skilled in the art may make various changes to the disclosed embodiments without departing from the spirit or scope of the present specification.

What is claimed is:

1. A frequency regulating circuit for a switching circuit, wherein the switching circuit is configured to receive an input voltage and generate an output voltage, wherein the frequency regulating circuit receives a first signal characterizing an output power and a second signal characterizing an input voltage to generate a third signal;
    wherein the third signal is used to adjust a maximum operating frequency of the switching circuit so that the maximum operating frequency decreases with an increase of the input voltage,
    wherein the frequency regulating circuit comprises:
        a charging current generating module, wherein the charging current generating module is configured to receive the first signal and the second signal to generate a charging current; and
        a signal generating module, wherein the signal generating module is configured to output the third signal according to the charging current,
    wherein the charging current generating module adjusts an amount of the charging current according to the second signal characterizing the input voltage, and the charging current decreases with the increase of the input voltage.

2. The frequency regulating circuit according to claim 1, wherein the charging current generating module comprises:
    a first current configured to be controlled by the first signal, wherein the first signal is a feedback voltage, and as the feedback voltage increases, the first current increases;
    a second current configured to be controlled by the second signal, wherein as the second signal increases, the second current increases; and
    a third current configured to be a difference between the first current and the second current;
    wherein the charging current is configured to be directly proportional to the third current.

3. The frequency regulating circuit according to claim 2, wherein the charging current generating module comprises:
    a variable resistor, wherein a first terminal of the variable resistor receives a voltage, a resistance value of the variable resistor is inversely proportional to the first signal, wherein a current flowing through the variable resistor is the third current;
    a maximum frequency setting resistor, wherein a first terminal of the maximum frequency setting resistor is connected to the variable resistor, and a second terminal of the maximum frequency setting resistor is connected to a reference ground, wherein a current flowing through the maximum frequency setting resistor is the first current;
    a second current generating module, wherein the second current generating module is configured to be controlled by the second signal to generate the second current increasing with an increase of the second signal; and
    a first current-controlled current source, wherein the first current-controlled current source is configured to be controlled by the third current flowing through the variable resistor to generate the charging current to be directly proportional to the third current.

4. The frequency regulating circuit according to claim 3, wherein when the first signal is less than a first threshold, the resistance value of the variable resistor is infinite;
    when the first signal is greater than the first threshold and less than a second threshold, the resistance value of the variable resistor is inversely proportional to the first signal; and
    when the first signal is greater than the second threshold, the resistance value of the variable resistor is zero.

5. The frequency regulating circuit according to claim 3, wherein the second current generating module comprises:
    a second current-controlled current source, wherein the second current-controlled current source is connected to both terminals of the variable resistor, and the second current-controlled current source is controlled by the second signal to generate the second current to be directly proportional to the second signal.

6. The frequency regulating circuit according to claim 3, wherein the charging current generating module comprises:
    a compensation resistor, wherein the compensation resistor receives the second signal, and the compensation resistor is connected between the maximum frequency setting resistor and the variable resistor, wherein a current flowing through the compensation resistor is the second current.

7. The frequency regulating circuit according to claim 1, wherein the third signal is a monopulse signal, and the maximum operating frequency of the switching circuit is adjusted according to a frequency of the third signal.

8. The frequency regulating circuit according to claim 7, wherein the signal generating module comprises:
    a timing capacitor, wherein the timing capacitor is configured to receive the charging current to generate a capacitor voltage;
    a first switch transistor, wherein the first switch transistor is configured to reset a voltage of the timing capacitor; and
    a first comparator, wherein a first input terminal of the first comparator is connected to a first terminal of the timing capacitor, a second input terminal of the first comparator is connected to a reference voltage, an output terminal of the first comparator is connected to a control terminal of the first switch transistor, and the first comparator compares the capacitor voltage with a magnitude of the reference voltage to generate the third signal.

9. A switching circuit, comprising the frequency regulating circuit of claim 1 and further comprising:
    a turn-on signal control circuit, wherein the turn-on signal control circuit is configured to output a first turn-on signal;

a turn-off signal control circuit, wherein the turn-off signal control circuit is configured to output a switch transistor turn-off signal;

a logic circuit, wherein the logic circuit receives the first turn-on signal and the third signal, outputs the first turn-on signal when a frequency of the first turn-on signal is lower than a frequency of the third signal, and outputs the third signal when the frequency of the first turn-on signal is higher than the frequency of the third signal; and a trigger, wherein a set terminal of the trigger receives an output signal of the logic circuit, a reset terminal of the trigger receives the switch transistor turn-off signal, and the trigger outputs a switch transistor drive signal.

10. The switching circuit according to claim 9, wherein the frequency regulating circuit further comprises:

a bias current generating circuit, wherein the bias current generating circuit is configured to generate a bias current for limiting a minimum value of the charging current, wherein a sum of the charging current and the bias current is used as a second charging current;

wherein the second charging current is used as an output signal of the charging current generating module.

11. The switching circuit according to claim 9, wherein the frequency regulating circuit comprises:

a first current configured to be controlled by the first signal, wherein the first signal is a feedback voltage, and as the feedback voltage increases, the first current increases;

a second current configured to be controlled by the second signal, wherein as the second signal increases, the second current increases; and a third current configured to be a difference between the first current and the second current;

wherein the charging current is configured to be directly proportional to the third current.

12. The switching circuit according to claim 9, wherein the third signal is a monopulse signal, and a maximum operating frequency of the switching circuit is adjusted according to a frequency of the third signal.

13. A frequency regulating circuit for a switching circuit, wherein the switching circuit is configured to receive an input voltage and generate an output voltage wherein the frequency regulating circuit receives a first signal characterizing an output power and a second signal characterizing an input voltage to generate a third signal;

wherein the third signal is used to adjust a maximum operating frequency of the switching circuit so that the maximum operating frequency decreases with an increase of the input voltage, wherein the frequency regulating circuit comprises:

a charging current generating module, wherein the charging current generating module is configured to receive the first signal and the second signal to generate a charging current; and a signal generating module, wherein the signal generating module is configured to output the third signal according to the charging current, wherein the charging current generating module further comprises:

a bias current generating circuit, wherein the bias current generating circuit is configured to generate a bias current for limiting a minimum value of the charging current, wherein a sum of the charging current and the bias current is used as a second charging current, and the second charging current is used as an output signal of the charging current generating module.

14. A frequency regulating method, comprising:

generating a charging current according to a first signal characterizing an output power and a second signal characterizing an input voltage; and outputting a third signal according to the charging current;

wherein the third signal is used to adjust a maximum operating frequency of a switching circuit, so that the maximum operating frequency decreases with an increase of the input voltage, wherein the charging current is a first charging current and wherein the step of generating the charging current further comprises:

generating a bias current for limiting a minimum value of the charging current, wherein a sum of the charging current and the bias current is used as a second charging current;

wherein the second charging current is used as an output signal of the charging current generating module.

15. The frequency regulating method according to claim 14, wherein the step of generating the charging current comprises:

controlling by the first signal to generate a first current, wherein the first signal is a feedback voltage, and as the feedback voltage increases, the first current increases;

controlling by the second signal to generate a second current, wherein as the second signal increases, the second current increases; and obtaining a third current by performing a difference operation between the first current and the second current;

wherein the first charging current is configured to be directly proportional to the third current.

16. The frequency regulating method according to claim 14, wherein the third signal is a monopulse signal, and the maximum operating frequency of the switching circuit is adjusted according to a frequency of the third signal.

* * * * *